United States Patent [19]

Dufour et al.

[11] 4,387,191

[45] Jun. 7, 1983

[54] HEAT STABILIZED POLYMERS

[75] Inventors: Daniel L. Dufour, Longmeadow; Alva F. Harris, Wilbraham, both of Mass.

[73] Assignee: Monsanto Company, St. Louis, Mo.

[21] Appl. No.: 361,325

[22] Filed: Mar. 25, 1982

[51] Int. Cl.$^3$ .................... C08K 5/52; C08L 35/04; C08L 35/06

[52] U.S. Cl. .................... 525/207; 524/145; 525/74; 526/271; 526/272; 526/329.2; 526/342

[58] Field of Search ............. 524/145; 525/207, 74; 526/271, 272, 329.2, 342

[56] References Cited

U.S. PATENT DOCUMENTS

| | | | |
|---|---|---|---|
| 2,439,227 | 4/1948 | Seymour et al. | 526/272 |
| 2,759,910 | 8/1956 | Milne et al. | 524/145 |
| 2,873,211 | 2/1959 | Roeser | 526/271 |
| 3,050,487 | 8/1962 | Solomon | 524/145 |
| 3,642,949 | 2/1972 | Stafford et al. | 525/74 |
| 3,793,401 | 2/1974 | Nield et al. | 525/74 |
| 3,794,616 | 2/1974 | Dennis et al. | 524/145 |
| 4,163,032 | 7/1979 | Liebig et al. | 525/74 |
| 4,167,543 | 9/1979 | Liebig et al. | 525/74 |
| 4,305,869 | 12/1981 | Lee et al. | 525/74 |

*Primary Examiner*—John Kight, III
*Assistant Examiner*—R. A. White
*Attorney, Agent, or Firm*—W. J. Farrington; P. D. Matukaitis; A. H. Cole

[57] ABSTRACT

The tendency to crosslink of polymer compositions comprising polymer units derived from acrylonitrile and maleic anhydride is controlled by the use of an acid ester of a phosphorus acid.

8 Claims, No Drawings

HEAT STABILIZED POLYMERS

BACKGROUND OF THE INVENTION

This invention relates to polymers and polyblends, comprising, as polymerized components, an unsaturated dicarboxylic acid anhydride and an unsaturated nitrile. More specifically, it relates to such polymers and polyblends that have been stabilized against certain effects of high temperatures.

It has been found that when maleic anhydride and acrylonitrile are present in the same polymeric environment, there is an apparent tendency for a reaction to occur that results in crosslinking and sometimes the evolution of carbon dioxide and/or water. This reaction occurs at elevated temperatures of the kind that can be reached during extrusion and molding operations. It would appear that the crosslinking occurs whether the acrylonitrile and maleic anhydride components are in the same or different polymer molecules.

The effect increases in significance with the amounts of the components and generally above about 15% of each component in a polymer composition is enough to generate the effect to a noticeable extent if the temperature is sufficiently elevated, that is above about 265° C.

While it is usually possible to extrude and mold at lower temperatures where no problem is encountered, it is desirable to provide accommodation for the wide variation of conditions that occur as a matter of course in a commercial operation. The present invention provides a means of reducing the significance of the crosslinking effect thus permitting the use of a wider range of molding and extrusion conditions with such polymers.

DISCUSSION OF THE PRIOR ART

The crosslinking effect referred to above has been identified, for example, in USP 4,223,096 which describes the preparation of rubber-modified terpolymers of styrene, maleic anhydride and acrylonitrile. In that patent, the crosslinking tendency is controlled by the use of chain transfer agents such that up to about 20% acrylonitrile can be incorporated in a polymer containing from 15% to 30% of maleic anhydride before the crosslinking tendency renders the polymer non-thermoformable.

Other polymers in which such a tendency might be encountered in at least part of the ranges described include thos described in USP Pat. Nos. 3,642,949, 4,141,934, 4,167,543, 4,197,263, 4,197,376 and 4,205,160.

U.S. application Ser. No. 324,900 filed 11/25/81 discloses the use of sulfur acids to control crosslinking and the tendency to blister in such polymers and polymer blends.

The present invention provides an alternative means of controlling this tendency and makes it possible either to extend the composition range so as to achieve even more advantageous properties, or to broaden the range of permissible processing conditions for the polymers.

DESCRIPTION OF THE INVENTION

The present invention provides a polymer composition with a reduced tendency to generate crosslinks comprising polymer units derived from an unsaturated nitrile and an unsaturated dicarboxylic acid anhydride, which composition comprises an effective amount between from 0.5 to 5 parts by weight of an acid ester of a polybasic phosphorus acid per 100 parts of the polymer composition.

The polymer composition can be provided by a single polymer or it may be a blend of polymers. Thus, the polymer composition can be, for example, a styrene/maleic anhydride/acrylonitrile terpolymer (or its rubber-modified equivalent) or a blend of a styrene/maleic anhydride copolymer (or its rubber-modified equivalent) with a styrene/acrylonitrile copolymer or an acrylonitrile/butadiene/styrene (ABS) copolymer or a nitrile rubber.

In general, the crosslinking effect begins even where the proportions of the nitrile and anhydride components are quite low but as might be expected, the significance of the effect increases proportionately with the amounts. Thus, the present invention has particular utility when the proportions of the nitrile and anhydride components are each above about 5% by weight of the composition weight. The process of the invention is particularly useful when the proportion of anhydride in the composition is between about 5 and 30% and the nitrile proportion is between about 5 and 20% of the total polymer composition.

The acid esters of phosphorus are those esters formed by incomplete esterification of a polybasic phosphorus acid using as an esterifying group a $C_1$ to $C_{20}$ substituted or unsubstituted, straight or branched-chain alkyl group. The preferred alkyl groups have from four to eighteen carbon atoms and include butyl, hexyl, octyl, 2-ethylhexyl, nonyl, decyl, dodecyl, 2-butyloctyl, stearyl, oleyl, palmityl and halo-, hydroxy-, and alkoxy-substituted derivatives of such groups. Excellent results have been obtained using unsubstituted $C_6$ to $C_{10}$ alkyl groups. Stearyl is also a preferred esterifying radical.

The polybasic acids of phosphorus from which the acid esters are formed are based on trivalent or pentavalent phosphorus and have generic formulas: $(HO)_3P$ (phosphorus acid); $(OH)_3P{:}O$ (phosphoric acid); $RO-P-(OH)_2$ (alkyl-or aryl-phosphoric acid); or

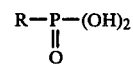

(e.g. phenylphosphonic acid) wherein R is a hydrocarbyl radical. Thus, the partial esters will necessarily be either the mono-ester or the diester. Commercial esters are often mixed esters so the description of any acid ester is intended to cover mixtures in which that esters is a major component. The polybasic acid of phosphorus is conveniently phosphoric acid but similar results may be obtained using partial esters of phosphorous acid, a phosphonic acid, and the like.

The amount added can be from about 0.5 up to 5 and for preferred acid esters, from 1 to 3, parts of the acid ester per 100 parts of the polymer composition weight. The effective amount of the acid ester employed will be determined to some extent by the size of the esterifying group. If this is large, that is from 6 to 20 carbon atoms, then the proportion used will tend towards the upper portion of the range. Where the ester is formed from $C_1$ to $C_5$ organic groups the lower end of the range specified will be more appropriate.

The acid ester can be added in any convenient manner but it is found that, when the anhydride-containing component and the nitrile-containing component are in different polymers, there is advantage in blending a portion of the acid with each polymer component before they are blended together or alternatively with the nitrile containing component alone. The reason for this effect is not known for certain but it may simply be a reflection of the better dispersion of the additive thereby obtained.

DESCRIPTION OF THE PREFERRED EMBODIMENTS

To illustrate the invention further two acid esters were blended with a polyblend comprising 36.5% by weight of a styrene/maleic anhydride/methyl methacrylate termpolymer comprising about 25.5% by weight of maleic anhydride and 63.5% of ABS (SAN-grafted polybutadiene particles dispersed in a matrix of an SAN copolymer) comprising about 13.7% by weight of acrylonitrile.

Except where otherwise indicated the terpolymer and a first ABS component were blended together with a plasticizer (where one was used), lubricant, antioxidant and with the acid ester. This was then blended with a further ABS component to give the above blend. The blend was dried at 80° C. in a circulating air oven and extruded in a one inch Killion extruder using a two stage screw with vent or compounded in a Banbury mixer. Blending temperatures of about 200° C. were used.

Pellets of the blend were vacuum dried 16 hours at 80° C. and molded in a one ounce Arburg molding machine using 800 psi pressure. Izod bars (1.27 cm × 1.27 cm × 12.7 cm) were molded directly from the Arburg at a stock temperature of 282° C., and also after "Dwell Times" (i.e. length of time in Arburg at stock temperature) of 5, 10 and 15 minutes. At each time, three bars were molded and inspected closely to determine the extent of any blistering (indicating decomposition) that had occurred. The bars were then ground in a Thomas mill. The ground bars were vacuum dried 16 hours and used to measure apparent viscosity at 100 sec$^{-1}$ at 246° C. using a Monsanto Automatic Capillary Rheometer. (Both the rheometer and the method for obtaining apparent viscosity are described in the Instruction Manual for Model 3501-H Automatic Capillary Rheometer designed and developed by Dr. Samuel Steingiser, Monsanto Research Corporation, Dayton, Ohio, April 1972 Edition). The change in apparent viscosity gives an excellent indication of the changes that occur after exposure to the elevated temperature for prolonged periods. A high viscosity indicates an increase in molecular weight due to crosslinking.

In some Examples the blends were also tested for Izod Impact Strength (using ASTM D-256) and Distortion Temperature Under Load or DTUL (using ASTM D-648) on injection molded samples. In addition, further samples were tested for Percentage Elongation at Fail (ASTM D-638). Gardner Impact was assessed on a 2.54 mm thick sample using as 1.17 cm diameter dart.

EXAMPLE

In this Example the performance of the di-(2-ethylhexyl) monoacid phosphate and mono(2-ethylhexyl) diacid phosphate are evaluated both as plasticizers and as stabilizers of the above blends against crosslinking. The results are set forth in Table 1.

TABLE 1

| Formulation | Performance of Acid Ester Stabilizers | | | | | | |
|---|---|---|---|---|---|---|---|
| | #1 | #2 | #3 | #4 | #5 | #6 | #7 |
| ABS | 63.5 | | 63.5 | 63.5 | | | |
| Terpolymer | 36.5 | | 36.5 | 36.5 | | 36.5 | 36.5 |
| Butyl Stearate | 1.00 | | | | | | |
| Di(2 ethylhexyl) Monoacid phosphate | | 0.5 | 1.0 | 2.0 | | | |
| Mono(2 ethylhexyl) diacid phosphate | | | | | 0.5 | 1.0 | 2.0 |
| Antioxidant[1] | 0.3 | 0.3 | 0.3 | 0.3 | 0.3 | 0.3 | 0.3 |
| PE Wax[2] | 0.1 | 0.1 | 0.1 | 0.1 | 0.1 | 0.1 | 0.1 |
| Properties | | | | | | | |
| DTUL °C. | 105.3 | — | 104.5 | 105.6 | — | 105.4 | — |
| Izod (J/in. notch) | 102.7 | — | 179 | 179 | — | 162.7 | 173.5 |
| Gardner (J) | 13.6 | — | 15.0 | 16.1 | — | 16.1 | 17.0 |
| Elongation at fail (%) | 26.3 | — | 44.1 | 41.3 | — | 39.9 | 42.7 |
| Stability Data[3] | | | | | | | |
| Viscosity after: | | | | | | | |
| 0 min. | 13.4 | 12.8 | 12.6 | 12.4 | 12.5 | 12.8 | 13.3 |
| 5 min. | 14.6 | 13.8 | 13.3 | 13.5 | 13.2 | 13.6 | 14.2 |
| 10 min. | 15.7 | 16.1 | 14.3 | 13.8 | 15.9 | 14.6 | 16.1 |
| Blistering after: | | | | | | | |
| 0 min. | Few | None | None | None | None | None | None |
| 5 min. | Present | Essen. None | Two Present | Two Present | None Present | None Present | None Present |
| 10 min. | Present | Present | Present | Present | Present | Present | Present |

Parts of additives incorporated are based on 100 parts by weight of the polymeric components.
(1) 1,3,5-trimethyl-2,4,6-tris[3,5-ditert-butyl-4-hydroxy benzyl] benzene.
(2) a low molecular weight polyethylene wax lubricant.
(3) viscosity and blistering are each assessed after the specified number of minutes held at stock temperature in the Arburg molding machine.

From the above it can be seen that the acid phosphates are not only as good or better plasticizers than the butyl stearate standard, but also make a significant contribution to the stabilization of the blend against blistering and inhibit crosslinking as demonstrated by the reduced rate of viscosity increase. The exception to this, (#5), which shows an unexpected viscosity increase that is out of step with the rest of the data obtained, may indicate that the presence of a large amount of acid functionality can be counter-productive in the suppression of crosslinking.

The use of phosphorus pentoxide in the above polyblends has some minor effect on blistering and crosslinking at the 0.5% level and on crosslinking at the 1% addition level. Above that level no beneficial effect is observed. It is theorized that this effect is a reflection of the presence of traces of water and thus of metaphosphoric acid.

While it appears that the active component of the acid ester is the acid, (with the ester portion providing beneficial property modifications by plasticization), it has been shown an excessive amount of acid functionality may actually impair the viscosity stability of the polymer composition. For this reason, the un-esterified acids are not regarded as attractive additives for the reduction of blistering.

This relationship between acid content and effectiveness is also indicated by the discovery that full esters of sulfur acids are also effective stabilizers, providing the esters are such that, at extrusion temperatures, they decompose to give the corresponding acid functionality.

From the above Examples, it will be seen that the acid esters are effective in controlling crosslinking and delaying the onset of blistering normally encountered in thermoforming a polyblend comprising units derived from an unsaturated anhydride monomer and an unsaturated nitrile monomer.

The polymer composition whose processability is improved by the use of the acid esters can be single polymers such as terpolymer of styrene, maleic anhydride and acrylonitrile or a rubber-modified version of such a polymer as described, for example, in U.S. Pat. application No. 4,262,096. Preferred terpolymers of this type comprise from 15 to 30% by weight of maleic anhydride and from 5 to 20% by weight of acrylonitrile. Particlarly advantageous terpolymers contain from 10 to 30% by weight of a rubber having a glass transition temperature below 0° C., and preferably below -30° C. Suitable rubbers include polybutadiene, polyisoprene, polychloroprene, EPDM rubbers, ethylene/vinyl acetate rubbers, acrylate rubbers and polypentenamer.

Alternatively, and often preferably some or all of the unsaturated nitrile can be provided by a different polymer from the providing the unsaturated dicarboxylic acid anhydride. Thus, the polymer composition can comprise an anhydride-containing polymer such as a styrene/maleic anhydride copolymer peferably one containing at least 10% by weight, and more preferably at least 20% by weight such as from 20 to 35% by weight of maleic anhydride, or a terpolymer with part of the styrene replaced by a non-nitrile copolymerizable monomer such as an acrylate or methacrylate ester so as to provide from 2 to 20% of the copolymer weight. The anhydride-containing polymer can, of course, be rubber-modified.

The nitrile-containing component of such a polymer composition can be provided by polymers such as styrene/acrylonitrile comprising from 20 to 70% by weight of acrylonitrile and acrylonitrile/butadiene/styrene (ABS) wherein the acrylonitrile content is preferably at least 8% and more preferably at least 15% of the ABS polymer weight.

The above exemplification is in terms of maleic anhydride and acrylonitrile but it is understood that some or all of these monomers can be replaced by their well known homologues such as (respectively) itaconic anhydride, aconitic anhydride and citraconic anhydride and methacrylonitrile.

In addition to the acid ester the polymer composition can contain other conventional additives such as antioxidants, plasticizers, chain-transfer agents, flame retardants, flow aids, pigments, antistatic additives, fibrous or particulate fillers and the like, to improve specific aspects of their physical or chemical properties. It is intended that all such and related modifications be considered within the purview of the invention.

What is claimed is:

1. A polymer composition having a reduced tendency to generate crosslinks during fabrication, which composition comprises polymer units derived from an unsaturated nitrile and from an unsaturated dicarboxylic acid anhydride and which also comprises an effective amount from about 0.5 to 5 parts by weight of an acid ester of a polybasic acid of phosphorus per 100 parts by weight of the polymer composition.

2. A polymer composition according to claim 1 which comprises at least 5% by weight of polymer units derived from each of the anhydride and the nitrile.

3. A polymer composition according to claim 1 in which the acid ester is a mono- or di-ester of phosphoric acid.

4. A polymer composition according to claim 1 in which the acid ester is selected from the group consisting of $C_4$ to $C_{12}$ alkyl mono- or di-esters of phosphoric acid.

5. A polymeric composition according to claim 1 in which the acid ester is selected from the group consisting of the 2-ethylhexyl and stearyl esters of phosphoric acid and is present in an amount of from 0.5 to 5 parts by weight based on 100 parts by weight of the polymer composition.

6. A polymer composition according to any of claims 1 to 5 in which the polymer units derived from the unsaturated nitrile and the anhydride are present in the same polymer.

7. A polymeric composition according to any of claims 1 to 5 in which the polymeric component comprises a terpolymer of styrene, acrylonitrile and maleic anhydride containing from 5 to 20% by weight of acrylonitrile and from 15 to 30% by weight of maleic anhydride.

8. A polymer composition according to any of claims 1 to 5 in which the polymeric component comprises a copolymer having from 50 to 83% by weight of styrene, from 10 to 35% by weight of maleic anhydride and from 2 to 20% by weight of methyl methacrylate and a copolymer of styrene and acrylonitrile containing from 20 to 70% of acrylonitrile, the relative proportions of the component polymers being selected to provide at least 5% based on the composition weight of each of the maleic anhydride and the acrylonitrile.

* * * * *